(12) United States Patent
Broussard et al.

(10) Patent No.: US 11,074,832 B2
(45) Date of Patent: Jul. 27, 2021

(54) WARMING OF SIMULATED BLOOD USING WASTE HEAT GENERATED BY ELECTRONIC COMPONENTS

(71) Applicant: Tellyes Scientific Inc., Tianjin (CN)

(72) Inventors: David N. Broussard, Lorena, TX (US); Charles G. Miller, Allison Park, PA (US); Jerry Woods, Pittsburgh, PA (US); Clifford D. Olmstead, Allison Park, PA (US); Yanfei Liu, Tianjin (CN); Zhaoqun Liu, Tianjin (CN); Shusheng Chen, Tianjin (CN); Zinan Qi, Tianjin (CN)

(73) Assignee: Tellyes Scientific Inc., Tianjan (CN)

( * ) Notice: Subject to any disclaimer, the term of this patent is extended or adjusted under 35 U.S.C. 154(b) by 293 days.

(21) Appl. No.: 16/058,134

(22) Filed: Aug. 8, 2018

(65) Prior Publication Data
US 2019/0057621 A1    Feb. 21, 2019

Related U.S. Application Data

(60) Provisional application No. 62/546,071, filed on Aug. 16, 2017.

(51) Int. Cl.
*G09B 23/28* (2006.01)
*G09B 23/30* (2006.01)

(52) U.S. Cl.
CPC .......... *G09B 23/28* (2013.01); *G09B 23/303* (2013.01)

(58) Field of Classification Search
CPC .............................. G09B 23/28; G09B 23/303

USPC ......................................................... 434/268
See application file for complete search history.

(56) References Cited

U.S. PATENT DOCUMENTS

| | | | | |
|---|---|---|---|---|
| 4,606,328 A | * | 8/1986 | Thoman | A61F 7/02 446/199 |
| 2007/0122785 A1 | * | 5/2007 | Eggert | G09B 23/28 434/272 |
| 2007/0292829 A1 | * | 12/2007 | King | G09B 23/285 434/268 |
| 2008/0134769 A1 | * | 6/2008 | Fan | G01N 15/082 73/76 |
| 2013/0309643 A1 | * | 11/2013 | Segall | G09B 23/303 434/268 |
| 2014/0272872 A1 | * | 9/2014 | Vozenilek | G09B 23/28 434/268 |
| 2016/0140878 A1 | * | 5/2016 | Fernandez | G09B 23/303 434/268 |

* cited by examiner

*Primary Examiner* — Thomas J Hong
(74) *Attorney, Agent, or Firm* — Buchanan Ingersoll & Rooney PC

(57) ABSTRACT

A medical simulator having a heat exchanger configured to transfer heat from electronics and other components of the medical simulator to simulated blood of a simulated vascular system of the medical simulator. The heated simulated blood can be circulated throughout the simulated vascular system to provide more realistic training for medical practitioners by increasing the temperature of the skin of the medical simulator to a more realistic temperature. Circulating the heated simulated blood can also serve to cool the electronics and other components, while simultaneously transferring the heat out from the vascular system into an environment outside of the medical simulator.

14 Claims, 3 Drawing Sheets

US 11,074,832 B2

WARMING OF SIMULATED BLOOD USING WASTE HEAT GENERATED BY ELECTRONIC COMPONENTS

CROSS-REFERENCE TO RELATED APPLICATIONS

This patent application is related to and claims the benefit of U.S. Provisional Patent Application No. 62/546,071, filed on Aug. 16, 2017, which is hereby incorporated by reference in its entirety.

FIELD OF THE INVENTION

Embodiments relate to a medical simulator having a heat exchanger configured to transfer heat from electronics and other components of the medical simulator to simulated blood of a simulated vascular system included within the medical simulator. The heated simulated blood can be circulated throughout the simulated vascular system to provide more realistic training for medical practitioners, to cool the electronics and other components, and to transfer heat out from the vascular system.

BACKGROUND OF THE INVENTION

As medical simulators become more complex and feature rich, the processing power also increases. As a result, it can be beneficial to pack more circuitry (e.g., CPU, GPU, DSP, etc.) in a smaller and more confined space. In addition, medical simulators can be used outside of the clinical environments, outdoors, and in conditions where water, dust, and other contaminants may enter the medical simulator and cause damage to the electronic components. Due to the harsh environment and space constraints, it can be beneficial for the circuitry to be packed tightly into a waterproof enclosure. In such situations, it may be desired to enclose al of the circuitry and components within the medical simulator (e.g., the medical simulator itself is the waterproof enclosure). Yet, attempting these desired features would generate a problem for prior art systems because the electronic components can quickly enter a thermal runaway state and permanently damage or destroy the electronic components. This is because with conventional systems there is no means to effectively transfer the heat from the electrical components without exposing them to the harsh environmental conditions.

One of the deficiencies of conventional medical simulators is the configuration of the cooling system to manage the heat generated by, and exposed to, the electronic components. For example, these systems typically rely on a fluid transfer medium that is circulated within the medical simulator to accept heat, then is caused to travel outside of the medical simulator to reject the heat, and then is caused to travel back into the medical simulator to complete the circuit. This circuit design can be problematic if the medical simulator has to be configured as a waterproof enclosure.

For example, liquid coolers have been used to cool the electronics (e.g., microprocessors, graphic processors and other heat generating electronic components) and remove unwanted heat therefrom. In these prior art systems, the waste heat is pumped to a radiator and expelled from the system. However, problems arise in sealed systems, such as a medical simulator, where the entire system in enclosed in a rubber skin, such that the radiators and cooling fans have no way of pumping the waste heat out of the system.

Some prior art medical simulators contain a simulated vascular system capable of simulating bleeding from various forms of trauma. The simulated vascular system typically consists of a reservoir containing simulated blood, a pumping system capable of generating blood pressure, and a series of tubes running throughout the simulator just under the rubber skin. Although these existing simulators have the capability of generating a pulse that can be felt and measured, the simulator skin remains at ambient temperature and lacks the realistic feel of a living subject.

The present invention is directed at overcoming one or more of the above-identified problems.

SUMMARY OF THE INVENTION

Combining an electronics liquid cooling system with a simulated vascular system of the medical simulator provides the ability to remove the waste heat from the electronic components by pumping the simulated blood through the CPU water block then through a series of tubes making up the vascular system. The heat is transferred from the simulated blood to the rubber skin and then out into surrounding air. This keeps the electronics from entering thermal runaway and also provides a realistic skin temperature.

Embodiments relate to a medical simulator having a heat exchanger configured to transfer waste heat from electronics and other components of the medical simulator to simulated blood of a simulated vascular system of the medical simulator. The heated simulated blood can be circulated throughout the simulated vascular system to provide more realistic training for medical practitioners by increasing the temperature of the skin of the medical simulator to a more realistic temperature. The heat can then be rejected from the medical simulator via the skin. Circulating the heated simulated blood in such a manner can serve to cool the electronics and other components, while transferring the heat out from the vascular system into an environment outside of the medical simulator. The configuration of the simulated vascular system disclosed herein can achieve effective cooling of the electrical circuitry without exposing the electrical circuitry or other components of the medical simulator to harmful environmental conditions.

In at least one embodiment, a medical simulator can include a medical simulator device (e.g., manikin) having a support structure and simulated skin resembling a human or other animal. The medical simulator can include a simulated vascular system housed within the simulated skin. The simulated vascular system can have at least one conduit configured to carry simulated blood. The medical simulator can include a pump in mechanical connection with the simulated vascular system. The pump can be configured to force the simulated blood to flow through the at least one conduit. The medical simulator can include a heat exchanger configured to accept heat and transfer the heat to the simulated blood. The at least one conduit can be routed to be in contact with or proximate to the simulated skin. The simulated blood can be configured to transfer the heat to the simulated skin, and the simulated skin can be configured to reject the heat to an environment outside of the medical simulator device.

Some embodiments can include electrical circuitry configured to cause the pump to generate a simulated blood flow scenario. In some embodiments, the heat exchanger can be configured to accept heat from the electrical circuitry. In some embodiments, the support structure and/or simulated skin can be configured to provide a waterproof enclosure for the simulated vascular system, the pump, the heat exchanger, and the electrical circuitry. In some embodiments, the at least one conduit can be positioned to be within the confines of the medical simulator. In some embodiments, the transfer of heat to the simulated skin can cause a least a portion of the simulated skin to increase in temperature from $T_{S1}$ to $T_{S2}$. In some embodiments, $T_{S2}$ can be approximately 98-degrees Fahrenheit. In some embodiments, the heat from the electrical circuitry can be waste heat. In some embodiments, the electrical circuitry can decrease in temperature from $T_{E2}$ to $T_{E1}$. In some embodiments, the electrical circuitry operating at $T_{E1}$ can prevent thermal runaway. Some embodiments can include at least one reservoir in fluid communication with the at least one conduit. In some embodiments, the heat exchanger can operate with a refrigerant comprising water or other viscous liquid comprising the simulated blood. In some embodiments, the heat exchanger can be a passive heat exchanger. In some embodiments, the heat exchanger can be a water block type heat exchanger. In some embodiments, the heat exchanger comprises a fluid channel that can separate from the at least one conduit of the simulated vascular system. In some embodiments, at least one of the heat exchanger and the electrical circuitry can be enclosed within an enclosure.

The simulated vascular system includes at least one conduit configured to carry simulated blood and a pump in mechanical connection with the at least one conduit. The pump can be configured to force the simulate blood to flow through the at least one conduit. The simulated vascular system can include electrical circuitry configured, among other things, to cause the pump to generate a simulated blood flow scenario. The simulated vascular system can include a heat exchanger in fluid connection with the at least one conduit. The heat exchanger can be configured to route the simulated blood through the heat exchanger to accept heat from the electrical circuitry and transfer the heat to the simulated blood.

In at least one embodiment, a method of warming simulated blood using waste heat from electrical component can involve placing a heat exchanger in proximity to the electrical circuitry of the medical simulator device. The method can involve connecting the heat exchanger to at least one conduit of a simulated vascular system of the medical simulator. The method can involve allowing simulated blood to flow through the simulated vascular system and through the heat exchanger, facilitating waste heat being transferred from the electrical circuitry to the simulated blood. The method can involve allowing the heated simulated blood to travel in proximity to simulated skin of the medical simulator device, facilitating the waste heat being transferred to the simulated skin.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present innovation will be more apparent from the following more particular description thereof, presented in conjunction with the following drawings. Like reference numbers used in the drawings are used to identify like components.

DETAILED DESCRIPTION OF THE INVENTION

The following description is of exemplary embodiments that are presently contemplated for carrying out the present invention. This description is not to be taken in a limiting sense, but is made merely for the purpose of describing the general principles and features of the present invention. The scope of the present invention is not limited by this description.

Figure 1:
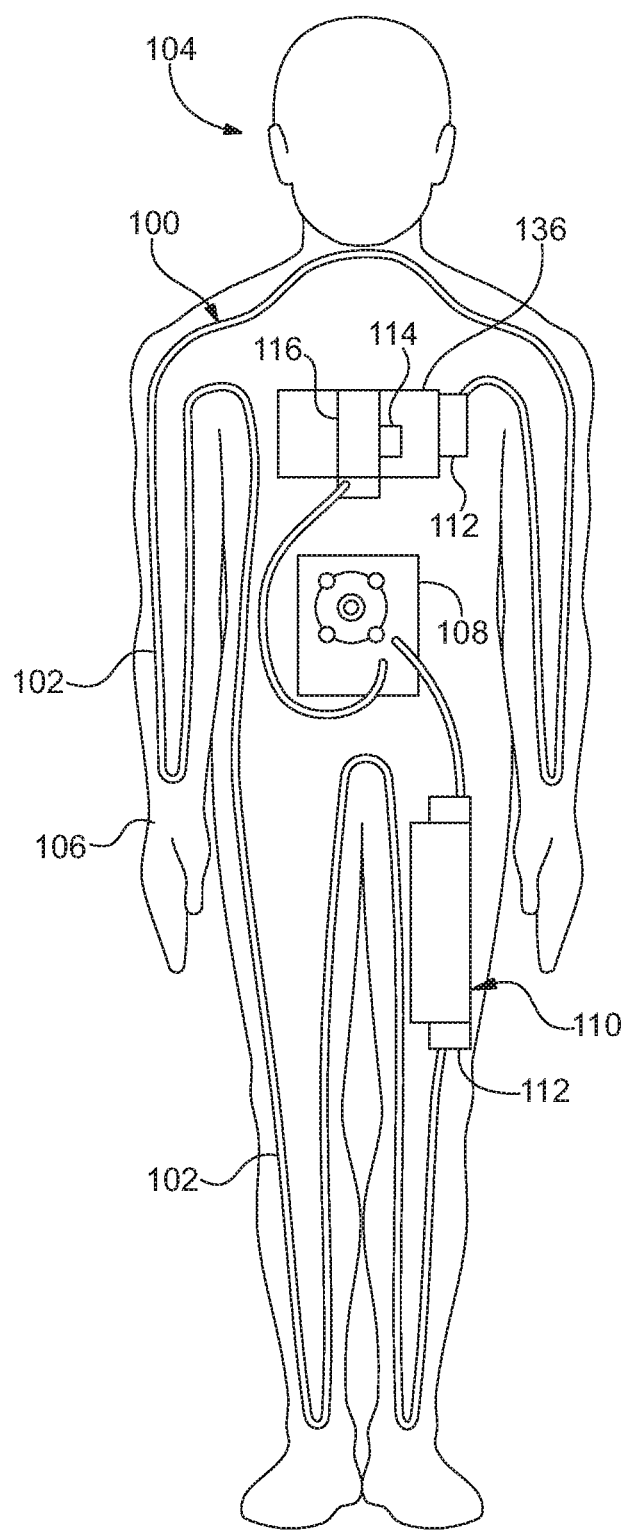
FIG. 1 shows an exemplary configuration of an embodiment of a simulated vascular system incorporated into an embodiment of a medical simulator.
Figure 2:
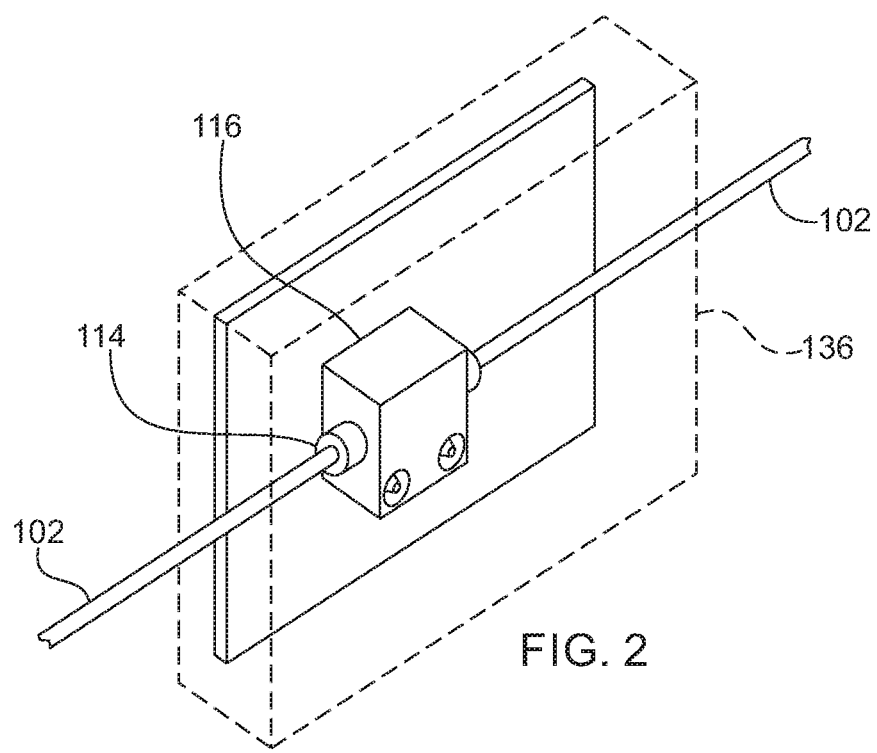
FIG. 2 shows an embodiment of an enclosure that may be used to house an embodiment of electrical circuitry for an embodiment of the medical simulator.
Figure 3:
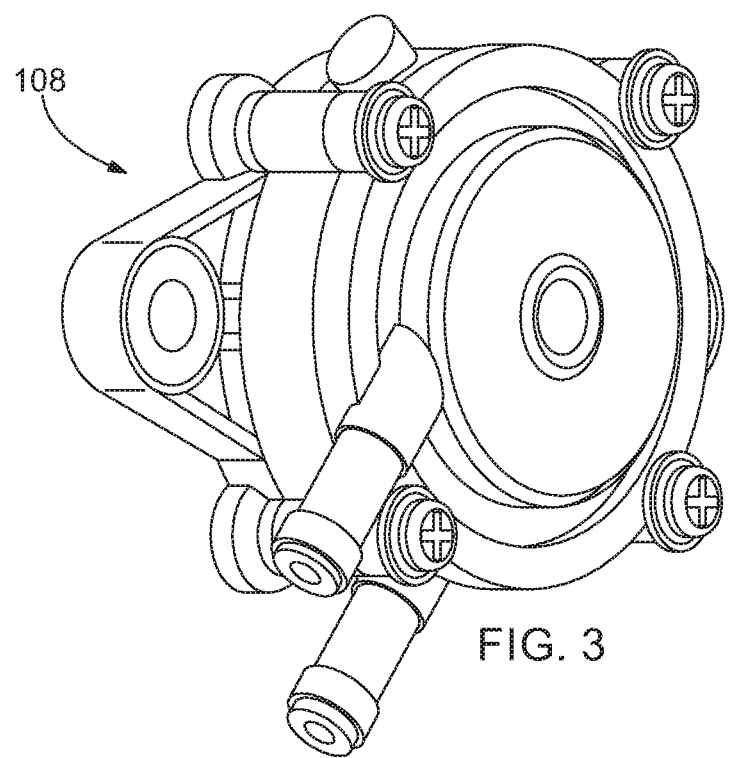
FIG. 3 shows an embodiment of a pump that can be used with an embodiment of the simulated vascular system.

Referring to FIGS. 1-3, embodiments can include a simulated vascular system 100. The simulated vascular system 100 can include at least one conduit 102 configured to allow fluid to pass there-through. In some embodiments, the simulated vascular system 100 can include a network of conduits 102. For example, a network of conduits 102 can be configured to resemble a vascular system of a human or some other animal, and the fluid can be configured to resemble blood (e.g., simulated blood).

In some embodiments, the simulated vascular system 100 is incorporated into a medical simulator 104. For example, the medical simulator 104 can be a manikin configured to resemble a human, and the simulated vascular system 100 configured to resemble at least a portion of the vascular system of a human. Embodiments of the medical simulator 104 include a support structure with an outer covering that resembles skin (e.g., simulated skin 106). The support structure is configured to support the simulated skin 106 and cause the simulated skin 106 to conform to a desired shape (e.g., a head, a leg, an arm, a torso, the entire body, etc.). In some embodiments, the support structure and/or the simulated skin 106 is configured to enclose the medical simulator 104 in a waterproof manner. For example, the medical simulator 104 can have at least one component use to generate simulated physiological functions of a human for training medical practitioners. The components can be housed within the support structure and/or simulated skin 106 so as to be protected or insulated from shock, water, debris, etc. The support structure can be fabricated from any one or a combination of plastic, metal, ceramic, etc. The simulate skin can be fabricated from any one or a combination of silicon, polymer, rubber, etc.

As noted herein, the simulated vascular system 100 is configured to resemble a vascular system of a human. In this regard, the simulated vascular system 100 is routed throughout at least a portion of the medical simulator 104, as would a real vascular system for a human would be. In some embodiments, at least a portion of the conduit(s) 102 is routed so as to be in contact with or proximate to the simulated skin 106. This can be done to resemble superficial veins (e.g., veins close to the surface of the skin). This can also be done to allow the simulated vascular system 100 to transfer and/or reject heat to the simulated skin 106. While the conduit 102 of the simulated vascular system 100 is described and illustrated as resembling superficial veins, the conduit(s) 102 can be configured to resemble other blood carrying vasculatures, such as deep veins, arteries, capillaries, etc. It should also be noted that while various embodiments of the conduit(s) 102 may be described as representing superficial veins, the conduit(s) 102 of the present disclosure are not limited to carrying simulated blood in one direction, as veins in a human would be. In other words, the conduit(s) 102 forming the simulated vascular system 100 can be configured to carry the simulated blood in any direction.

The simulated vascular system 100 includes at least one pump 108. The pump 108 is configured to circulate the simulated blood throughout at least a portion of the simulated vascular system 100. The pump 108 can be a positive displacement pump, a rotary pump, a reciprocating pump, etc. Some embodiments can include a variable speed pump 108.

The simulated vascular system 100 includes at least one reservoir 110 configured as a container to hold a predetermined volume of simulated blood. Depending on the operating parameters (e.g., simulated blood flow rate, volume of simulated blood flow in the system, etc.) of the simulated vascular system 100, the pump 108 can be used to draw simulated blood from the reservoir 110 (causing simulated blood to be removed from the reservoir 110 so as to reduce the volume of simulated blood contained in the reservoir), dispense simulated blood into the reservoir 110 (causing simulated blood to be introduced into the reservoir 110 so as to increase the volume of simulated blood contained in the reservoir 110), pass simulated blood through the reservoir 110 (causing simulated blood to enter and exit the reservoir so as to neither increase nor decrease the volume of blood contained within the reservoir 110), or by-pass the reservoir 110. In some embodiments, the simulated blood can be routed through the conduit 102 of the simulated vascular system 100 and be only selectively directed into or pulled out from the reservoir 110. For example, the reservoir 110 can include a valve 112 configured to selectively allow simulated blood to enter the reservoir 110 and/or exit the reservoir 110. Some embodiments can include a plurality of reservoirs 110. At least one reservoir 110 of the plurality of reservoirs 110 can be configured to have simulated blood be routed through it each time the simulated blood is caused to circulate through the simulated vascular system 100. At least one other reservoir 110 of the plurality of reservoirs 110 can be configured to selectively allow simulated blood to enter or exit the reservoir 110 when the simulated blood is caused to circulate through the simulated vascular system 100.

The medical simulator 104 includes electrical circuitry 114, which can include at least one processor operatively associated with a non-volatile and non-transitory memory. This can include an integrated circuit, a circuit board, a central processing unit, a graphics processing unit, a digital signal processor, sensors, switches, input/output devices, and/or other electrical components. The electrical circuitry 114 can include application software stored on any of the memories and programmed to cause any of the processors to execute functions for controlling various aspects of the simulated vascular system 100 and/or the medical simulator 104. For example, the application software can be programmed to cause any one or combination of pumps 108 and/or valves 112 to operate in a concerted manner to generate a predetermined simulated blood flow scenario. This may be done to provide a desired training scenario for medical practitioners.

Figure 4:
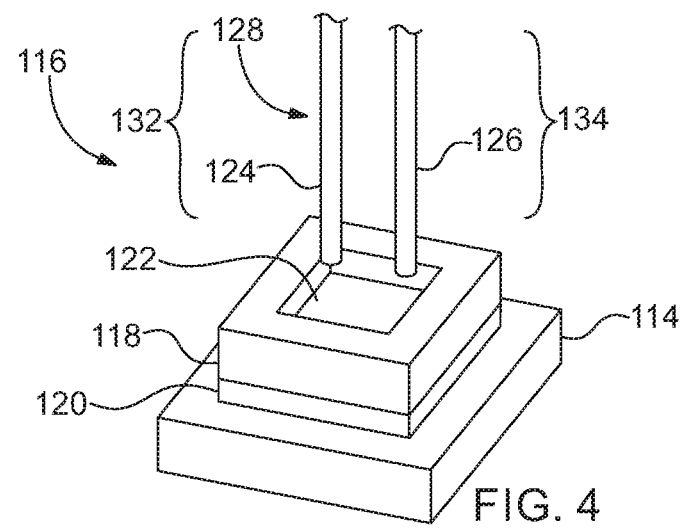
FIG. 4 shows an embodiment of a heat exchanger that can be used with an embodiment of the simulated vascular system.
Figure 5:
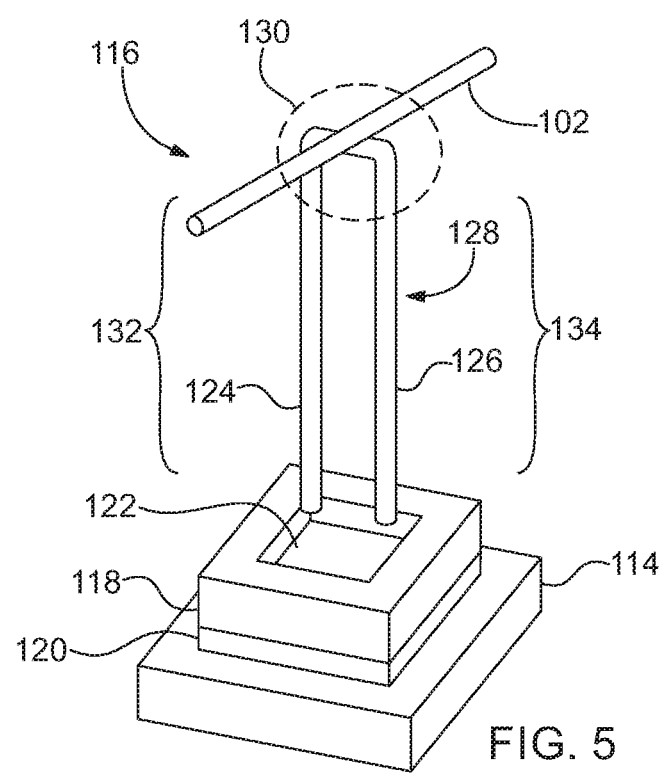
FIG. 5 shows another embodiment of a heat exchanger that can be used with an embodiment of the simulated vascular system.

Referring to FIGS. 4-5, in some embodiments, the simulated vascular system 100 can include a heat exchanger 116.

The heat exchanger 116 can be a passive heat exchanger, such as a heat sink for example. In at least one embodiment, the heat exchanger 116 can be configured as a water block type heat exchanger. For example, the heat exchanger 116 can be configured to have a base 118 having a thermally conductive plate 120. The base 118 can further include a heat exchange chamber 122 in which fluid at temperature $T_{F1}$ is allowed to flow there-in via a first channel portion 124 of a fluid channel 128, and fluid at temperature $T_{F2}$ is allowed to flow there-from via a second channel portion 126 of the fluid channel 128, wherein $T_{F1} < T_{F2}$. The thermally conductive plate 120 can be placed in contact with or placed proximate to at least one component of the electrical circuitry 114. Heat generated by the electrical circuitry 114 can be transferred to the heat exchange chamber 122 via the thermally conductive plate 120. This can cause the temperature of the electrical circuitry 114 to decrease from $T_{E2}$ to $T_{E1}$. The heat can then be transferred to the fluid to increase the temperature of the fluid from $T_{F1}$ to $T_{F2}$.

In accordance with the present invention, the fluid of the heat exchanger 116 is the simulated blood of the simulated vascular system 100. It should be noted that the fluid channel 128 can be part of the conduit 102 network of the simulated vascular system 100 in this embodiment. (See FIG. 4). For example, the first channel portion 124 can be routed from the reservoir 110 and/or from a location proximate the simulated skin 106 to the heat exchange chamber 122 so as to carry simulated blood at $T_{F1}$ to the heat exchanger 116. The simulated blood is pumped by the pump 108. Heat is transferred to the simulated blood from the electrical circuitry 114 to cause the temperature of the simulated blood to increase to $T_{F2}$. This causes the temperature of the electrical circuitry 114 to decrease from $T_{E2}$ to $T_{E1}$. The heated simulated blood at $T_{F2}$ is pumped to a location proximate the simulated skin 106 via the second channel portion 126. Heat from the simulated blood is transferred to the simulated skin 106 to cause the temperature of the simulated skin 106 to increase from $T_{S1}$ to $T_{S2}$. This causes the simulated blood to decrease in temperature from $T_{F2}$ to $T_{F1}$. The simulated blood at $T_{F1}$ is pumped to the reservoir 110 or back to the heat exchanger 116 to complete another circulation. The heat from the simulated skin 106 is transferred to an environment outside of the medical simulator 104, causing the temperature of the simulated skin 106 to decrease from $T_{S2}$ to $T_{S1}$. Transferring the heat to the outside environment can facilitate rejecting heat from the system 100 and/or the medical simulator 104.

In at least one embodiment, the fluid of the heat exchanger 116 can be water or some other refrigerant. It should be noted that the fluid channel 128 in this embodiment is separate and distinct from the conduit 102 of the simulated vascular system 100. (See FIG. 5). For example, the first channel portion 124 can be routed from a simulated blood heat exchange region 130 of the simulated vascular system 100 to the heat exchange chamber 122 so as to carry fluid at a first temperature $T_{W1}$ to the heat exchanger 116. Heat is transferred from the electrical circuitry 114 to the fluid to cause the temperature of the water to increase to $T_{W2}$. This causes the temperature of the electrical circuitry 114 to decrease to $T_{E1}$. The water at temperature $T_{W2}$ is routed to pass over or be routed so as to be proximate to the simulated blood heat exchange region 130 of the simulated vascular system 100 via the second fluid channel 128. The heat of the fluid at $T_{W2}$ is transferred to the simulated blood in the simulated blood heat exchange region 130. This causes the simulated blood to increase in temperature from $T_{B1}$ to $T_{B2}$ and the fluid at $T_{W2}$ to decrease to $T_{W1}$.

As noted herein, embodiments can include the conduit(s) 102 being routed so as to be in contact with or proximate to the simulated skin 106. In at least one embodiment, the conduit(s) 102 is routed so that the simulated blood at $T_{B2}$ is routed from the simulated blood heat exchange region 130 and further routed so as to be in contact with or proximate to at least a portion of the simulated skin 106. This causes the heat from the simulated blood to transfer to the simulated skin 106 so as to cause the simulated skin's temperature to increase from $T_{S1}$ to $T_{S2}$. As noted above, the simulated skin 106 transfers heat to an environment outside of the simulated vascular system 100 or medical simulator 104 (i.e., reject heat out-from the simulated vascular system 100 or the medical simulator 104). This causes the simulated skin 106 to reduce in temperature from $T_{S2}$.

With the embodiment using water within the fluid channel 128, the fluid channel 128 can be a closed loop system. For example, the fluid channel 128 can be configured to allow water at temperature $T_{W2}$ to travel from the heat exchange chamber 122 and to the simulated blood heat exchange region 130 via the second channel portion 126, and allow water at temperature $T_{W1}$ to travel from the simulated blood heat exchange region 130 to the heat exchange chamber 122 via the first channel portion 124, forming a closed loop water fluid channel 128. As noted above, the heat exchanger 116 can be configured as a passive heat exchanger. This can be achieved by the closed loop water fluid channel 128 having a low temperature side 132 and a high temperature side 134. Heat transfer to the water can occur within the high temperature side 134, and heat transfer from the water can occur within the low temperature side 132. The temperature differential of the water within the loop 128 causes a differential in thermal expansion and thus a pressure differential of the water within the high temperature side 134 as compared to the water within the low temperature side 132. This pressure differential causes the water to circulate throughout the fluid channel 128.

Regardless of the embodiment used, the simulated blood at $T_{F2}$ or $T_{B2}$ can be continuously circulated so as to continuously transfer heat to the simulated skin 106 (depending on some simulated blood flow scenarios), and thus the simulated skin 106 can maintain a temperature of approximately $T_{S2}$ even while the simulated skin 106 is rejecting heat from the medical simulator 104. However, it is also contemplated for the simulated blood at $T_{F2}$ or $T_{B2}$ to not be continuously circulated for some simulated blood flow scenarios, and thus the simulated skin 106 may be less than $T_{S2}$, which can include being at $T_{S1}$.

In at least one embodiment, the electrical circuitry 114, or any portion thereof, can be enclosed within an enclosure 136. In addition, the heat exchanger 116, or any portion thereof, can also be enclosed with the enclosure 136. The enclosure 136 can be configured to seal (e.g., generating a fluid-tight seal so as to prevent fluid from entering and/or exiting the enclosure 136) and/or insulate (e.g., providing thermal, electrical, optical, optical, etc. insulation to and from the components within the enclosure 136) the electrical circuitry 114 and/or the heat exchanger 116.

In a non-limiting and exemplary operation, the simulated vascular system 100 can include a network of conduit 102 configured to circulate simulated blood there-through. The simulated vascular system 100 can be incorporated within a medical simulator 104 having simulated skin 106 covering at least a portion of the medical simulator 104. In some embodiments, the simulated skin 106 of the medical simulator 104 encloses the medical simulator 104 in a waterproof manner. The network of conduit 102 can include at least one reservoir 110, each reservoir 110 having a valve 112 to facilitate controlled flow of the simulated blood into and out-from the reservoir 110. The simulated vascular system 100 can include at least one pump 108, each pump 108 configured to selectively cause the simulated blood to flow at a predetermined rate through at least a portion of the simulated vascular system 100. The simulated vascular system 100 can include electrical circuitry 114 in electromechanical connection with each pump 108 and each valve 112, the electrical circuitry 114 being configured to, among other things, coordinate operations of each pump 108 and each valve 112 and provide for at least one simulated blood flow scenario. The simulated vascular system 100 can include a heat exchanger 116 configured to transfer heat from the electrical circuitry 114 to the simulated blood.

In one embodiment, the conduit 102 can be routed so that at least a portion of the conduit 102 forms the fluid channel 128 of the heat exchanger 116. The heat exchanger 116 is configured to accept heat from the electrical circuitry 114 and transfer it to the simulated blood at the heat exchanger 116. For example, the simulated blood at $T_{F1}$ is caused to flow out from the reservoir 110 and to the heat exchange chamber 122. The simulated blood at $T_{F1}$ in the heat exchange chamber 122 accepts heat from the electrical circuitry 114, and increases in temperature to $T_{F2}$. Simulated blood at $T_{F2}$ is caused to flow from the heat exchanger 116 to a location proximate the simulated skin 106, allowing heat to be transferred to the simulated skin 106 so that the simulated skin 106 increases in temperature from $T_{S1}$ to $T_{S2}$ and allowing the simulated blood to decrease in temperature to $T_{F1}$. The simulated blood at $T_{F1}$ is circulated back to the reservoir 110 and/or the heat exchanger 116 to accept more heat from the electrical circuitry 114. The heat within the simulated skin 106 is transferred to an environment outside of the medical simulator 104, thereby rejecting the heat from the system that is the medical simulator 104.

In one embodiment, at least one portion of the conduit 102 can be routed through a simulated blood heat exchange region 130 of the medical simulator 104. The heat exchanger 116 is configured to accept heat from the electrical circuitry 114 and transfer it to the simulated blood at the simulated blood heat exchange region 130. For example, the simulated blood at $T_{B1}$ is caused to flow out from the reservoir 110 and to the simulated blood heat exchange region 130. The heat exchanger 116 causes fluid at $T_{W1}$ to flow towards the electrical circuitry 114, accept heat from the electrical circuitry 114, and increase in temperature to $T_{W2}$. Fluid at $T_{W2}$ can flow from the heat exchanger 116 to the simulated blood heat exchange region 130. The fluid at $T_{W2}$ is routed to be in proximity to the simulated blood at $T_{B1}$ within the simulated blood heat exchange region 130, allowing heat to transfer from the fluid to the simulated blood and causing the fluid to decrease in temperature to $T_{W1}$ while causing the simulated blood to increase in temperature to $T_{B2}$. The fluid at $T_{W1}$ is circulated back to the heat exchanger to accept more heat from the electrical circuitry 114. The simulated blood at $T_{B2}$ is caused to flow through the conduit 102 so as to be in proximity to the simulated skin 106. This causes heat to transfer from the simulated blood to the simulated skin 106, allowing the simulated blood to decrease in temperature to $T_{B1}$ while allowing the simulated skin 106 to increase in temperature from $T_{S1}$ to $T_{S2}$. The simulated blood at $T_{B1}$ is caused to flow back to the reservoir 110. The heat within the simulated skin 106 is transferred to an environment outside of the medical simulator 104, thereby rejecting the heat from the system that is the medical simulator 104.

The simulated skin 106 increasing to $T_{S2}$ provides medical practitioners training with the medical simulator 104 a more realistic training experience due to the more realistic body temperature sensation that may be generated by transferring heat from the electrical circuitry 114 to the simulated skin 106. For example, a medical practitioner training with the medical simulator 104 can touch the simulated skin 106 (e.g., take the pulse of the manikin) and be provided with a body temperature sensation of $T_{S2}$ (e.g., 98 degrees Fahrenheit). In addition, transferring heat from the electrical circuitry 114 and rejecting it to an environment outside of the medical simulator 104 can prevent a thermal runaway state for the electrical circuitry 114, while allowing the medical simulator 104 to be configured as a waterproof enclosure.

It should be understood that modifications to the embodiments disclosed herein can be made to meet a particular set of design criteria. For instance, the number of or configuration of medical simulators 104, heat exchangers 116, pumps 108, and/or other components or parameters may be used to meet a particular objective.

It will be apparent to those skilled in the art that numerous modifications and variations of the described examples and embodiments are possible in light of the above teachings of the disclosure. The disclosed examples and embodiments are presented for purposes of illustration only. Other alternative embodiments may include some or all of the features of the various embodiments disclosed herein. For instance, it is contemplated that a particular feature described, either individually or as part of an embodiment, can be combined with other individually described features, or parts of other embodiments. The elements and acts of the various embodiments described herein can therefore be combined to provide further embodiments.

Therefore, it is the intent to cover all such modifications and alternative embodiments as may come within the true scope of this invention, which is to be given the full breadth thereof. Additionally, the disclosure of a range of values is a disclosure of every numerical value within that range, including the end points. Thus, while certain exemplary embodiments of apparatuses and methods of making and using the same have been discussed and illustrated herein, it is to be distinctly understood that the invention is not limited thereto but may be otherwise variously embodied and practiced within the scope of the following claims.

What is claimed is:

1. A medical simulator, comprising:
   a medical simulator device comprising a support structure and simulated skin resembling human or other animal;
   a simulated vascular system housed within the medical simulator device, the simulated vascular system comprising at least one conduit configured to carry simulated blood;
   a pump in mechanical connection with the simulated vascular system, the pump configured to force the simulated blood to flow through the at least one conduit; and
   a heat exchanger configured to accept heat from electrical components housed within the medical simulator device and transfer the heat to the simulated blood, the heat exchanger being a water block type heat exchanger;
   wherein the at least one conduit is routed to be in contact with or proximate to the simulated skin; and
   wherein the simulated blood is configured to transfer the heat to the simulated skin causing at least a portion of the simulated skin to increase in temperature from $T_{S1}$ to $T_{S2}$, and the simulated skin is configured to discharge the heat to an environment outside of the medical simulator device.

2. The medical simulator recited in claim 1, wherein the electrical components comprise an electrical circuitry configured to cause the pump to generate a simulated blood flow scenario.

3. The medical simulator recited in claim 2, wherein the support structure and/or simulated skin is configured to provide a waterproof enclosure for the simulated vascular system, the pump, the heat exchanger, the electrical components and the electrical circuitry.

4. The medical simulator recited in claim 1, wherein the at least one conduit is positioned to be within the confines of the medical simulator device.

5. The medical simulator recited in claim 1, wherein $T_{S2}$ is approximately 98 degrees Fahrenheit.

6. The medical simulator recited in claim 1, wherein the heat from the electrical components is waste heat.

7. The medical simulator recited in claim 1, wherein the electrical components decrease in temperature from $T_{E2}$ to $T_{E1}$.

8. The medical simulator recited in claim 7, wherein the electrical components operating at $T_{E1}$ prevents thermal runaway.

9. The medical simulator recited in claim 1, further comprising at least one reservoir in fluid communication with the at least one conduit.

10. The medical simulator recited in claim 1, wherein the heat exchanger operates with a refrigerant comprising water.

11. The medical simulator recited in claim 1, wherein the heat exchanger operates with a refrigerant comprising the simulated blood.

12. The medical simulator recited in claim 1, wherein the heat exchanger comprises a fluid channel that is separate from the at least one conduit of the simulated vascular system.

13. The medical simulator recited in claim 1, wherein the heat exchanger comprises a fluid channel that is part of the at least one conduit of the simulated vascular system.

14. The medical simulator recited in claim 2, wherein at least one of the heat exchanger and the electrical circuitry is enclosed within an enclosure.

* * * * *